United States Patent [19]
Gerke et al.

[11] 3,723,660
[45] Mar. 27, 1973

[54] SWITCHING CIRCUIT ARRANGEMENT FOR CROSS-WIRE CONTROL APPARATUS FOR COMMUNICATION SYSTEM

[75] Inventors: Peter Gerke, Grafelfing; Helmüth-Joachim Bock, Munich; Anton Sennefelder, Gilching, all of Germany

[73] Assignee: Siemens Aktiengesellschaft, Berlin, Germany

[22] Filed: Dec. 21, 1970

[21] Appl. No.: 99,838

[30] Foreign Application Priority Data

Dec. 19, 1969 Germany....................P 19 63 755.3

[52] U.S. Cl...........................................179/18 GF
[51] Int. Cl...........................................H04m 3/00
[58] Field of Search..................................179/18 GE

[56] References Cited

UNITED STATES PATENTS 3,280,267 10/1966 Feucht..........................179/18 GE

*Primary Examiner*—Ralph D. Blakeslee
*Attorney*—Birch, Swindler, McKie & Beckett

[57] ABSTRACT

Control and auxiliary voltage sources are selectively connected to matrix row and column control inputs establishing a potential difference therebetween and across a selected receiving switching relay and its associated diode. The potential difference is fixed so that in the case of a diode breakdown, relays connected to that selected row and column are not affected. The biasing resistances assigned to each row and column are assigned values relative to the established potential difference resulting in minimum power dissipation. Make and break contacts serve to provide the necessary connections, and auxiliary biasing resistances associated therewith provide uninterrupted function of the device.

7 Claims, 1 Drawing Figure

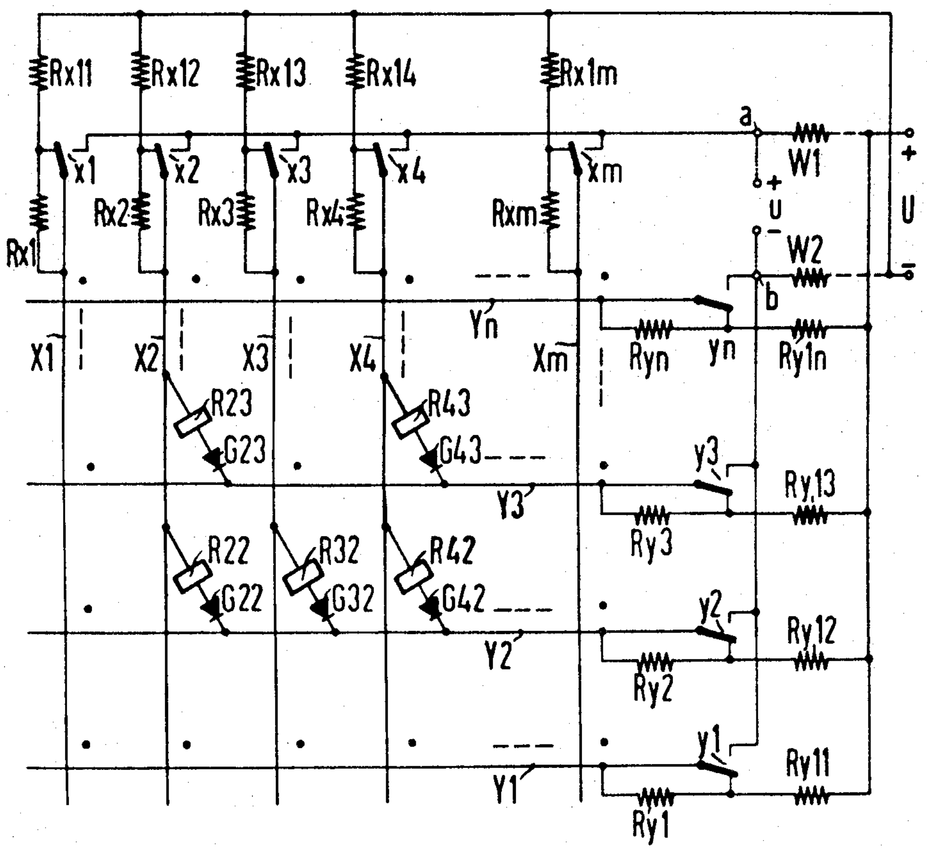
Rx11
Rx12
Rx13
Rx14
Rx1m
a
W1
+
U
u
W2
b
x1
x2
x3
x4
xm
Rx1
Rx2
Rx3
Rx4
Rxm
Yn
X1
X2
X3
X4
Xm
Ryn
yn
Ry1n
R23
G23
R43
G43
y3
Ry13
Y3
Ry3
R22
G22
R32
G32
R42
G42
y2
Ry12
Y2
Ry2
y1
Ry11
Y1
Ry1

SWITCHING CIRCUIT ARRANGEMENT FOR CROSS-WIRE CONTROL APPARATUS FOR COMMUNICATION SYSTEM

BACKGROUND OF THE INVENTION

The invention disclosed herein is related to a switching arrangement for switching apparatus constructed in matrix form in a communication system, especially telephone exchange installations having cross-wire or cross-field control apparatus in which directional current conductors or rectifiers, for example diodes, are utilized for decoupling receiving switching means, for example coupling relays, which are connected between each individual row input lead and column input lead at the cross point thereof. These are connected one after another in series. An auxiliary voltage is applied across so-called biasing resistances at these row input leads and column input leads to bias all of the directional conductors in the blocking direction. An oppositely poled control voltage is selectively applied across low resistance devices to selectively influence the receiving switching means at selected cross points of the matrix control field. The poles of this control voltage source exhibit potentials which lie within the potential range of the auxiliary voltage source.

Such a switching arrangement is shown generally in German Pat. No. 1,162,883. Due to the fact that the negative (or positive) pole of the control voltage source is more negative (or more positive) than the negative (positive) pole of the auxiliary voltage source, not only are the rectifiers connected in series with coupling relay coils at the cross points of the row and column input leads, which are not to be connected biased in the blocking direction, but also the rectifiers at the cross points of the row input leads which are connected and the column input leads which are not connected, as well as at the cross points of the column input lead which is connected and the row input leads which are not connected, biased in the blocking direction. Thus, the blocking currents, which flow across the diodes at the cross points of all the row input leads which are not connected, and all column input leads which are not connected are prevented from flowing collectively through a row or column over the relay that lies in each case at the cross point with the selected row input lead or column input lead. In switching apparatus control fields of large size in which measures in accord with German Pat. No. 1,162,883 are not taken, the collective effect of these currents can be a current through a single relay which surpasses the error current value of the relay. This undesired effect is overcome by the invention of the cited patent.

Another problem in control fields of this type consists in the widespread effect of switching errors, especially those which occur during operation. Errors through defects in decoupling diodes are especially to be considered. A diode defect may consist of a complete current path break or disruption, or of a complete internal short circuit. In the latter case the internal resistance in both current directions is for practical purposes equal to zero. The problem is to limit the effect of defects in directional current conductors which provide decoupling in matrix control fields of the described type to the receiving switching means which lies on the same cross point. In known switching arrangements, for example those of the type disclosed in German Pat. No. 1,162,883, a circuit is formed including the row input lead which is connected, the column input lead on which the defective directional conductor lies, over the receiving switching means which lies at the cross point of this connected row input lead and this column input lead and the directional conductor biased in the direction of passage, thence over the row input lead on which the defective directional conductor lies and over the receiving switching means connected in series with this defective conductor, further over the connected column input lead and thence over the receiving switching means which lies at the cross point of this column input lead with the last named row input lead (on which the defective conductor lies) and in series with the directional conductor associated therewith and biased in the direction of passage. In addition to the receiving switching means connected in series with the defective directional conductor, further receiving switching means may under certain circumstances, be erroneously functionally influenced, resulting in errors which must be avoided.

This invention is especially useful in switching arrangements such as are shown, for example, in the German Pat. No. 1,296,214 wherein a multiplicity of separate switching matrixes, each switching matrix being similar to the type described above, are incorporated in a system in which the row and column input leads of these switching matrixes are successively ordered so that the several matrixes are interdependent. In this case a defect in a directional conductor renders not only the two coordinate leads of the one individual coupling matrix which are connectable over the assigned coupling point unuseable but also all the corresponding coordinate leads in the other coupling matrixes in the same row of coupling matrixes corresponding to the row input lead and the column input lead.

SUMMARY OF THE INVENTION

The object of this invention is achieved by establishing a potential difference on the one hand between the terminal of the auxiliary voltage source connected to the row input lead and the terminal of the control voltage source connectable to the column input lead, and on the other hand between the terminal of the auxiliary voltage source connected to the column input lead and the terminal of the control voltage source connectable to the row input lead. This potential difference is to be equal to or greater than the voltage drop due to a short circuit of a directional conductor at the pertinent biasing resistance on the one side of the affected row input lead and on the other side of the affected column input lead. As a result, when a defect occurs in a directional conductor, which normally serves as a decoupling means, the directional current conductors which are connected in a series with the associated receiving switching means which lie at the cross point of the row input lead or column input lead which is connected to the control voltage source and to the same column or row, and in whose cross point the defective directional conductor lies remain properly biased. Thus the error produced by a defective directional conductor is limited in its effect to the receiving switching means, for example coupling relays, directly connected in series therewith. Diode defects are thoroughly accounted for in the application of this invention to the control of relay coupling matrixes in the seeking of a path in through multiple step coupling field in that the affected coupling point and the row and/or column leads which are subordinate to it (that are for example the speech and signal circuits which are connectable with each other through coupling relay contacts) are evaluated as busy. This is especially usable in a multiple matrix having an arrangement of common row input leads and column input leads tied together in multiple coupling matrixes in accord with the previously mentioned German Pat. No. 1,296,214 and affected by a diode defect.

In an alternative embodiment, the ratio of the internal resistance of each of the receiving switching means to the resistance value of each formed resistance connected to the row input lead (or column input leads) is at least as large as the ratio of the control voltage to the voltage difference between the terminal of the auxiliary voltage source connected to the row input lead (or column input lead) and the pole of the control voltage source connectable to the column input lead (or row input lead). In this embodiment the biasing resistance has a value such that on the one hand the described operation of the invention is assured, and that on the other hand the current in a formed resistance at a connected row input lead or column input lead is maintained at a minimum value.

In accord with another further development of the invention make and break contacts serve to connect the control voltage to the row input leads and the column input leads, their working contacts being connected with the appropriate poles of the control source, their rest contact springs being connected with the appropriate poles of the auxiliary voltage source over the assigned formed resistance and their contacts common to the rest and the working sides being connected with the given row input lead or column input lead. As a result, the biasing resistances at the row input leads and column input leads to which the control voltage is applied are disconnected. This makes possible the use of resistances having greatly reduced maximum power dissipation to apply the bias voltage, so that the expenditure of power in switching is substantially reduced.

In accord with another further development of the invention an additional auxiliary biasing resistance is connected in parallel with the rest contact side of each of the make and break contacts. The auxiliary voltage which biases, or forms the directional conductor at the appropriate row input lead at the appropriate column input lead is applied through this auxiliary biasing resistance during the contact change time of one of the marking contacts developed in the described manner as a make and break switch.

The drawing of an exemplary embodiment is limited to the principal components necessary for understanding of the invention.

DESCRIPTION OF PREFERRED EMBODIMENTS

The disclosed exemplary embodiment includes two variations or modes of operation. The first variation or mode can be distinguished by dotted lines and a control voltage source +U, –U. The second variation is distinguished by the dashed lines and resistances W1, W2.

First to be described is the first named variation, which embodiment omits the dashed lines and the resistances W1, W2.

A number of row input leads Y1 . . . Yn and a number of column input leads X1 . . . Xm are shown. The row input leads (or column input leads) are connected through the contacts *y*1 . . . *yn* (or *x*1 . . . *xm*) individually and alternately to the control voltage source *u*. In the rest condition the decoupling diodes of all the coupling relays are biased in the blocking direction in a known manner or form. By connecting the voltage source u to a row input lead, for example Y2 through contact *y*2, and a column input lead, for example X2 through contact *x*2, a coupling relay, for example R22, is activated in a known manner. The voltage of the voltage source u, through which, as previously described, the coupling relay R22 is activated, is smaller than the voltage of the auxiliary voltage U to which the biasing resistances Rx1 . . . Rxm, Ry1 . . . Ryn are directly connected. The potentials of the two voltage sources +U, –U and +u, –u are graded or stepped in the following order:

$$+U, +u, -u, -U. \qquad (1)$$

Upon the energization of a coupling relay for example R22, the decoupling diodes of the coupling relays at the cross points of the unconnected row and column leads are biased in the blocking direction in a known manner over the biasing resistances, for example Rx11, Rx13 . . . Rx1m; Ry1, Ry3 . . . Ryn. For example, the diode G43 is biased in the blocking direction over the following circuit:

$$-U, Rx14, x4, X4, R43, G43, Y3, y3, Ry13, +U \qquad (2)$$

In like manner are biased the diodes associated with all of the coupling relays which lie at the cross points between a connected row input lead (or column input lead) and an unconnected column input lead (or row input lead). With the activation of the marking contacts *x*3 and *y*2, for example, the diode G32 is biased over the following circuit:

$$-u, (b), y2, Y2, G32, R32, X3, x3, Rx13, -U \qquad (3)$$

The exemplary embodiment of FIG. 1 is now considered in its second variation or mode. The voltage source +*u*, –*u* is omitted in this variant and the points *a*, *b* are connected through the resistances W1, W2 to the same voltage +*U*, –*U*, as the biasing resistances Rx1 . . . Rx1m, Ry1 . . . Ryn. In the rest position all the diodes G . . . are biased in a known manner. In the operating condition all the diodes G . . . are also biased in the same manner with the exception of those over which an associated coupling relay R . . . is functionally activated, as has previously been described for the working example in the first operating mode. The necessary voltage gradations which according to the first mode are available through the application of a special voltage source +*u*, –*u* having small voltage, are brought about in the working examples according to this second variation by barrier resistances in the energizing circuit of the relay to be energized. The mode of operation in other respects is the same as for the working example according to the first variant. A particular advantage of this second mode of operation lies in the fact that in place of a special voltage source +*u*, –*u* the voltage drop is utilized which appears at the barrier resistances W1, W2 upon operation energization of a given coupling relay.

Next the operative characteristics of the described exemplary embodiment are to be considered.

In matrix arrangements of the type described in which individual coupling relays connected to the cross points of row input leads and column input leads have diodes connected in series therewith, technical disturbances occasionally occur. For example, a diode breakdown may result in a complete break in the current path, or a complete internal short circuit in both current directions. In case of such a breakdown it is important, that the effect on the circuit operation be limited as much as possible. The effect of a diode defect on the relay connected directly in series therewith is clearly unavoidable. It is however important, that the disruptive effect is limited hereto. This requirement is fulfilled in the described embodiment not only for a complete current path break but also for a complete internal short circuit of a decoupling diode. In this embodiment, the potential difference on the one hand between the terminal of the auxiliary voltage source U connected with the row input lead and the terminal of the control voltage source u connectable to the column input lead and on the other hand between the terminal of the auxiliary voltage source U connected with the column input lead and the terminal of the control voltage source *u* connectable to the row input lead, is equal to or greater than the voltage drop due to a short circuit of a decoupling diode (for example G43) across the appropriate biasing resistances for example Rx14 which is connected to one side of the affected row input lead X4 and Ry13 which is connected to the other side through the affected column input lead Y3. Through an appropriate selection of the voltage values of the voltage sources as well as the resistance values of the relay windings and the biasing resistances the ratio of the internal resistance of each receiving switching means to the resistance value of each of the biasing resistances connected to the row input leads (or column input leads) is equal to or greater than and preferably twice as great as the ratio of the control voltage to the voltage difference between the terminal of the auxiliary voltage source connected to the row input lead (or column input lead) and the terminal of the control voltage source connectable to the column input lead (row input lead).

If an internal short circuit arises in decoupling diode G43, for example, then this defect remains limited to the relay connected in series with this diode, for example R43. Considering the possibility that all of the marking contacts are at rest, the following circuit is brought about by the diode defect:

$$+U, Ry\mathbf{13}, y\mathbf{3}, Y\mathbf{3}, G\mathbf{43}, R\mathbf{43}, X\mathbf{4}, x\mathbf{4}, Rx\mathbf{14}, -U \quad (4)$$

Assuming that the relay R43 is energized as herein described, the relays are independent of the current direction; however, the invention is in no way limited to embodiments utilizing relays which are independent of the current direction. In circuit (4) the voltage drop at the formed resistances *Ry*13 and *Rx*14, are smaller than the potential difference between the positive (or negative) pole of the auxiliary voltage source *U* and the positive (or negative) pole of the control voltage source *u* due to the above described selected value of the biasing resistances and relay windings.

If now the marking contacts *x*2 and *y*2 are activated as described, thereby energizing the relay R22 then as a result of the previously described malfunction and the voltage drop across the biasing resistance Ry13, the unselected row input lead Y3 is more positive then the selected column input lead X2. Further, as a result of the voltage drop across the biasing resistance Rx14 unselected column input lead X4 is more negative than the selected row input leads Y2. Consequently the decoupling diodes G23 and G42 are biased in the blocking direction in spite of the defective diode G43. As a result the relays R23 and R42 cannot be erroneously activated.

Changes may be made in the embodiment shown without departing from the scope of the invention. For example, the rest side of the row marking or selecting contacts *y*1 through *yn* and the rest side of the column marking contacts *x*1 through *xm* may be brought together and connected to the appropriate terminal of the auxiliary voltage source U over a biasing resistance common to each of the row marking contacts and the column marking contacts. The values of these common biasing resistances are selected in the same manner as the individual formed resistances they represent.

Where, as previously described, individual biasing resistances are used for each row input lead and column input lead, the marking contacts may be formed as working contacts. In this case the formed resistances, for example Rx14 and Ry13, are connected not with the rest sides of the make and break switches but rather directly with the appropriate column input lead, for example X4, and the appropriate row input lead, for example Y3. In this case the formed resistances are selected to provide a sufficient voltage drop.

Referring to the auxiliary biasing resistances Rx1 through Rxm and Ry1 thru Ryn, the application of these auxiliary biasing resistances is based on development of the marking contacts are made and break contacts as is shown in the drawing. These auxiliary biasing resistances serve to assure that during the transit time of the marking contact which has been activated and serves as a switching contact, the selected row input lead and the selected column input lead exhibit a defined voltage potential.

Finally it is also pointed out that the rectifier defects of the type described herein may be detected and located in the coupling field through switching apparatus not shown herein. These locations are retained in a storage apparatus for example a path occupied storage, and are considered therein during a path seeking process. Thus the affected coupling point and the line and column leads assigned to it (such as for example the speech and signal circuits which are selectively connectable to each other over the coupling relay contacts) are evaluated as busy. This is useful in an arrangement of common row input leads and column (input leads coupled together in multiple coupling matrixes as described in German Pat. No. 1,296,214, where limited to that coupling matrix affected by the defective diodes.

What is claimed is:

1. In a switching apparatus constructed in matrix form comprising row and column input leads and having a switching device connected at each junction of a row and column lead, said switching device being operable to connect the respective row and column leads, each said switching device comprising a series combination of directional current conductor means and switch means, each said directional current conductor means being constructed and arranged in said matrix as to decouple the said switch means in series therewith from the remainder of said matrix, said switching apparatus further comprising an auxiliary voltage source having oppositely-poled terminals connected, respectively, over first and second biasing resistance means to, respectively, said column and row input leads for biasing said directional conductors in the blocking direction, a selectively connected control voltage source having oppositely-poled terminals connectable to predetermined ones of said switch means for energizing same to connect the associated row and column leads, the improvement comprising:

said control voltage source being constructed to have an output voltage of a value lying within the value of the output voltage appearing at the terminals of said auxiliary voltage source and said first and second biasing resistance means being constructed to have resistance values such that, upon occurrence of a short circuit in one of said directional current conductors, the potential difference on one side of said matrix between a terminal of said auxiliary voltage source connected to the affected row input lead and the terminal of said control voltage source connectable to a column input lead and on the other side of said matrix between the terminal of said auxiliary voltage source connected with the affected column input lead and the terminal of said control voltage source connectable to a row input lead is equal to or greater than the voltage drop appearing across the said second biasing resistance means associated with a short circuited directional conductor and the said first biasing resistance means associated with the column input lead connected to the short circuited directional conductor, said voltage drop resulting from the short circuiting of said directional conductor.

2. Apparatus as claimed in claim 1, wherein the ratio of the internal resistance of each of the switch means to the resistance value of each of the biasing resistance means connected to the row input leads is at least as great as the ratio of the control voltage to the voltage difference between the terminal of the auxiliary voltage source connected to the row input lead and the terminal of the control voltage source connectable to the column input lead.

3. Apparatus as claimed in claim 2 wherein the ratio of the internal resistance of each of the switch means to the resistance value of each of the biasing resistance means connected to the column input leads is at least as great as the ratio of the control voltage to the voltage difference between the terminal of the auxiliary voltage source connected to the column input lead and the terminal of the control voltage source connectable to the row input lead.

4. Apparatus as claimed in claim 2, including make and break contact switch means for connecting the control voltage to the pertinent row input lead and the column input lead, wherein the working contacts of said switch means are connected to the pertinent terminals of the control voltage source, the rest contacts of said switch means are connected across the pertinent biasing resistance means to the terminals of the auxiliary voltage source, and the contacts of said contact switch means which in each switch are common to the rest and working side are connected with the pertinent row input lead or column input lead.

5. Apparatus as claimed in claim 4, wherein an auxiliary biasing resistance means is connected in parallel with the rest contact side of each of the make or break contacts.

6. Apparatus as claimed in claim 4, wherein said biasing resistance means includes a biasing resistance device common to a plurality of row input leads.

7. Apparatus as claimed in claim 6 wherein said biasing resistance means includes a biasing resistance device common to a plurality of column input leads.

* * * * *